United States Patent [19]

O'Dette et al.

[11] 4,207,099
[45] Jun. 10, 1980

[54] PRODUCT AND PROCESS FOR NON-DUSTING ALUMINUM GRAIN

[75] Inventors: John H. O'Dette; Stanton E. Jack, both of Kingston, Canada

[73] Assignee: Alcan Research and Development Limited, Canada

[21] Appl. No.: 885,957

[22] Filed: Mar. 13, 1978

[30] Foreign Application Priority Data

Mar. 24, 1977 [CA] Canada .................................. 274647

[51] Int. Cl.² .............................................. B22F 9/00
[52] U.S. Cl. ........................................ 75/251; 241/17
[58] Field of Search ................... 75/0.5 R, 0.5 B, 251; 241/17

[56] References Cited

U.S. PATENT DOCUMENTS

| | | | |
|---|---|---|---|
| 2,431,565 | 11/1947 | Klock | 241/17 |
| 2,942,792 | 6/1960 | Anderson et al. | 241/17 |
| 3,322,529 | 5/1967 | Pollock | 75/0.5 B |
| 4,115,107 | 9/1978 | Booz et al. | 75/0.5 R |

*Primary Examiner*—L. Dewayne Rutledge
*Assistant Examiner*—Michael L. Lewis
*Attorney, Agent, or Firm*—Lane, Aitken & Ziems

[57] ABSTRACT

A new aluminum grain, together with a process for its preparation, suitable for use in blasting agents is described. The grain, obtained by shearing sheet material of various types with a modified cutter comprises largely flat particles with jagged edges, and contains minimal quantities both of oversize and undersize particles.

12 Claims, 4 Drawing Figures

MAGNIFICATION 12 X

MAGNIFICATION 25X

MAGNIFICATION 25X

MAGNIFICATION 12 X

MAGNIFICATION 12 X

PRODUCT AND PROCESS FOR NON-DUSTING ALUMINUM GRAIN

BACKGROUND OF THE INVENTION

This invention relates to particulate aluminum, suitable for use in the preparation of explosives and blasting agents. In this context, the particulate aluminum used is commonly referred to as "aluminum grain".

A "blasting agent" is an explosive material, generally comprising a mixture of at least two essential components: a fuel and an oxydiser. The agent can be either a dry powder or a slurry; slurries are generally aqueous systems. The choice of dry or slurry depends to some extent on the conditions in which the blasting agent is to be used. In modern blasting practice, dynamite and other systems related to nitro-glycerin have now almost completely been replaced by systems in which ammonium nitrate is the oxydiser, and a carbonaceous compound, e.g. a hydrocarbon oil, is the fuel. These systems, if blended properly, are both effective blasting agents, and are comparatively safe to handle, in either dry or water-wet slurry form. They are generally described as AN-FO systems, or blasting agents.

In general, dry AN-FO systems have two disadvantages: low density, and low water resistance. In an attempt to overcome these main disadvantages, the water slurry systems were developed. These slurries generally contain about 15% water. But, in their turn, although the slurries do to some extent overcome the density and water resistance problems, in that a water-wet system will still explode the slurries also have the disadvantage that they are much less sensitive to detonation than the dry systems. They therefore require the use of sensitizers or boosters, or both. Two common materials used for sensitization are paint-grade aluminum powder, which is particulate aluminum of a very fine particle size, or TNT prills. TNT, being a high explosive, adds its own peculiar handling problems. Paint-grade aluminum flake also is not free of handling problems, as is discussed more fully below.

It has also been found that the bulk strength, as an explosive, an AN-FO blasting agents can be considerably improved by the addition thereto of energetic metal fuels: for reasons of cost and availability, the commonest used is aluminum grain. Exactly how aluminum grain enters into the chemical reactions that go on during detonation is not known. There are two possibilities: it can either react with the ammonium nitrate, or it can react with water present in the system. In theory, either of these reactions will lead to the release of considerable amounts of energy, the aluminum—water reaction probably releasing the most. It has been reported that a 40/40/20 mix of ammonium nitrate/aluminum grain/water generates about 2.1 kcal/g. In view of this, aluminum grain is widely used in AN-FO systems, but not without some problems being encountered.

One common problem, which available theory does not adequately explain, is that blasting agents containing paint grade aluminum powder as sensitizer in a slurry system are known to go "dead" and not explode (either at all, or to give the required blasting effects). One theory advanced to explain this is the so-called "hot-spot" initiation process. The aluminum grains are assumed to have adhering thereto microscopic air bubbles: these bubbles come under great pressure from the initiator shock wave, and detonation is then caused by the resulting adiabatic heating. But this theory does not meet all of the available evidence. For although a "dead" system can be reactivated by aeration, but it can also be reactivated by blending in air filled glass or plastic microscopic capsules or ballotini. Further, the amount of oxide present on the grain also appears to affect its sensitivity.

But by far the major problem inherent in using aluminum grain is either sensitizer, for which a fine particle size seems to be needed, or as a metallic fuel, in compounding either dry or wet AN-FO mixes is a handling problem encountered in most of the commercially available materials. This problem is that both paint-grade powder and commercially available blasting grain, whether made by air blowing, disintegration by dropping molten metal into water, or hammer milling, contain a proportion of extremely fine powder which presents a considerable dust explosion hazard. This explosion hazard has had an adverse effect on the use of AN-FO-aluminum grain systems, even though such systems have clear advantages as blasting agents.

This problem has been studied before. One proposed solution is to coat the aluminum grain, with a thin layer of polytetrafluoro-ethylene, or a closely related polymer. Whilst this procedure is effective, it also results in much lowered sensitivity—thus calling for a more powerful initiator system—and also lowered output. By this it is meant that up to 30% more aluminum grain may be needed to achieve the same blasting effect, when compared to untreated aluminum grain. This invention seeks to provide an aluminum grain which retains both its sensitivity and power.

SUMMARY OF THE INVENTION

This invention seeks to overcome these difficulties by providing an aluminum grain that is both of a suitable size for use in blasting agents, contains minimal amounts of free fines of a size liable to cause dust explosions, and also which will not cause the blasting agent to go "dead" and not explode.

This invention founds upon the discovery that a new, jagged, aluminum grain containing minimal, if any, free fines can be prepared by comminuting aluminum sheet by shearing it. The sheet used can be either virgin sheet, or it can be scrap material. Further, both commercially pure aluminum and aluminum alloys can be processed by this method to provide usable aluminum blasting grain. Also, the grain thus obtained has only the usual thin surface layer of oxide conventionally found on aluminum exposed to air.

Hitherto, attempts at comminuting aluminum sheet, or the like, into small jagged particles by shearing it, have failed. The difficulty encountered has been that both the cutting chamber and the aluminum sheet particles become heated in the shearing process. As a result of this, the cut fragments weld both to themselves, and to the cutter blades, resulting in a clogged and jammed cutting machine. The overheating also dulls the cutter blade edges, thereby exacerbating the problem. The use of cutting lubricants, which has been found effective in other fields with other metals, has not provided a solution. Waxes, hydrocarbon and silicone oils and solid lubricants such as talc have all been tried by Applicants, but with only limited success, and certainly not to the level of a commercially feasible operation. Applicants have now discovered that thin aluminum sheet, typically about 0.015 in, can be successfully sheared into a jagged grain suitable for use in a blasting agent which contains minimal amounts of both free fine particles and less than 5% of welded multile particles if two precautions are observed: first, stearic acid is used to lubricate the aluminum feed, and, second, the shearing machine is modified to permit fluid cooling thereof to maintain the cutting chamber temperature in the screen area below about 70° C., and preferably below about 65°0 C.

Thus in a first aspect this invention provides a continuous process for producing particulate aluminum material which comprises comminuting aluminum sheet material by shearing in the presence of stearic acid as lubricant and at a cutting chamber temperature of below about 70° C.

Preferably the amount of stearic acid is from 0.05 to 4.0 percent by weight, more preferably from 0.05 to 0.5 percent by weight, and most preferably 0.07 to 0.15 percent by weight, of the weight of the aluminum feed.

Preferably the cutting chamber temperature is below 65° C., and more preferably is in the range from 35° C. to 50° C.

In a second aspect this invention provides an aluminum particulate material comprising plate-like particles having a pair of largely flat and parallel opposed faces and jagged edges, in which material: (a) less than 5% by weight is particles larger than a desired range, comprising welded multiple particles, and (b) less than 0.5% is fine dust-size particles.

Preferably the proportion of oversize particless is less than 1%, and more preferably less than 0.5%

Preferably the proportion of undersize dust particles is less than 0.2% by weight.

Conveniently the maximum particle size is small enough to pass a 6 mesh Tyler standard sieve, although a maximum size of passing 10 mesh is preferred, and the minimum size is large enough to be retained by a 65 mesh Tyler standard sieve.

DESCRIPTION OF PREFERRED EMBODIMENTS

The process of this invention is operated as follows. Strip aluminum of up to 0.20 in. thickness, derived from scrap cans, sheet, scrap from can-making, foil, thin cast strip, reject extrusions, etc., is fed into a cutter, for example a Cumberland Model 20, at a suitable rate (the rate is clearly determined by the cutter machine size). The cutter is fitted with a screen; a product suitable for a blasting agent is obtained with a screen having ⅛" or 3/32" holes. The comminuted material is fed from the cutter to a screener, usually made up of two layers. The top layer is conveniently 10 mesh, and the lower 65 mesh. ,both Tyler standard. Any dust formed passes the 65 mesh screen and can be discarded. Material passing the 10 mesh and retained by the 65 mesh is removed as product. The material retained on the 10 mesh can either be recirculated to the cutter, retained and recut later, or fed to a second independent cutter. If two cutters are used, then it is found convenient to use a ¼" screen in the first, and a ⅛" screen in the second handling the +10 mesh material from the first cutter. Air conveyors, belt systems, or othe convenient means can be used to convey the comminuted material.

The shearing machine used in this process has to be modified to control the cutting chamber temperature. In a Cumberland-type machine this can be achieved by cooling the blade mounts through the incorporation of fluid cooling passages. It is constructionally easier to modify the fixed blade mount to incorporate therein the said passages through which a fluid, for example water, can flow and although this can provide adequate cooling of the cutter chamber it is preferable to also cool the rotor in a similar fashion. The cutter chamber temperature has to be maintained below about 65° C. and preferably in the range 35°-50° C. This cutter chamber temperature is conveniently determined by measuring the temperature of the screen by means of a thermocouple.

BRIEF DESCRIPTION OF THE FIGURES

The aluminum grain produced by this process is different in appearance to grains produced by other processes, and at present commonly used in blasting agents. This can be clearly seen from the attached photo-micrographs in which.

Figure 1:
FIG. 1 shows conventional aluminum powder prepared by the blowing process.
Figure 2:
FIG. 2 shows a commercial blasting grain made by processing foil in a hammer mill, known as "Canbro 9199"
Figure 3:
FIGS. 3 and 4 show grains prepared according to this invention, of different sizes.
Figure 4:
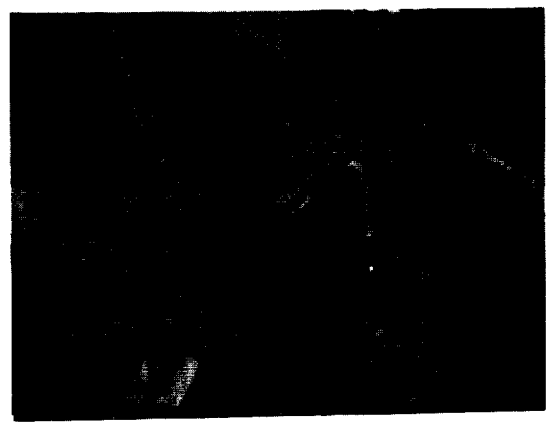

Comparison of these powders, as shown in these photo-micrographs, reveals two essential references. Although in all four photo-micrographs there is considerable scatter in size, the materials in FIGS. 3 and 4 are substantially free of fines; the blown powder of FIG. 1 clearly contains a proportion of fines. Also, the particles in FIGS. 1 and 2 are of a substantially rounded shape (which is to be expected for the blown powder of FIG. 1); since a sphere has the lowest surface:volume ratio of any solid shape, this is potentially a disadvantage in a product required to react quickly. In contrast, the particles in FIGS. 3 and 4 have a large surface area to volume ratio and present many sharp corners and jagged edges.

In view of the fact that these new grains are of different particle shape, and, in particular are larger than grains commonly used (note that FIGS. 1 and 2 are at 25 X magnification, whilst FIGS. 3 and 4 are at 12 x, which is approximately half of the others) tests were carried out to measure both their handling characteristics, which are important in blending both wet and dry mixes, and their explosive properties.

The grains were found to handle well, with no "hang up" when being transferred from a hopper. They were also found to contain minimal fines, a typical sieve analysis being as follows; for material produced by single stage cutting:

| +10 mesh (Tyler): | 0.2% by weight |
| --- | --- |
| 10 to +14 mesh | 30.0% |
| −14 to +20 mesh | 48.5% |
| −20 to +35 mesh | 20.5% |
| −35 to +65 mesh | 0.8% |
| | 100.0% |

Thus some 99% of material fell in the range 10 to +35, with essentially zero fines detectable ty sieve analysis. Therefore, this material appears to decrease substantially, if not eliminate, the dust explosion hazard associated hitherto with blasting agent grade aluminum grain. This material also appears to "pack" better, in comparison to commercially used grains. Thus Canbro 9199 as in FIG. 2 has a bulk density of about 50 lbs/cu. ft. as compared to about 83 lbs/cu. ft. for the material of FIG. 4 above, which sizes at −10/−20 Tyler mesh. This leads to economies in use and transportation, and also allows of higher weight loadings of grain per volume of blasting agent.

In terms of explosive or blasting properties, there is no one single standard comparison test: the only effective test is whether it will operate satisfactorily in a bore hole in a quarry or mine to give the "execution" desired. Specific tests were carried out to determine detonation velocity of an AN/FO dry mix containing 6% and 10% by weight of the grain of FIG. 4. These gave results of 14,000 to 15,000 fps, which compare very favourably to the figure of about 14,250 fps. generally obtained for AN-FO mixes, using the same grade of ammonium nitrate.

It is stated above that the grain of this invention can be prepared from almost any available reasonably thin feed stock. A typical feed is scrap from can making, faulty cans, and used scrap cans; much of this material is lacquered or painted. Since the available blasting grade aluminum grain is essentially "clean" and free of lacquers, printing, etc. tests were run with material obtained by chopping up used scrap cans, in the as-received condition (that is, no attempt was made to clean them, etc., apart from magnetic removal of ferrous materials, which would damage the cutters). The lacquer apparently had no effect on detonation velocity.

Also in view of the diverse range of materials which can be used, tests were run on various aluminum alloys, containing Fe, Si, Cu, Mg, Zn AND Mn. Of these, only alloys containing significant amounts of Cu (above 3%) and Zn (above 1%) indicated an impaired performance. These alloys showed a lower detonation velocity, and also a lower power, judged by comparing crater sizes under roughly equivalent conditions.

Probably the most unusual property of this new grain is the fact that its size, which is considerably larger than grain commonly in use, appears to have no deleterious effects on its properties. The grain appears to react completely in the detonation process, with no indication of the phenomenon of "jetting forward". The addition of this grain to a standard AN-FO mix gives an appreciable increase in power, judged by crater size or "execution", on the basis of experimental tests and in field tests in mines, with no appreciable decrease in detonation velocity.

What we claim as our invention is:

1. A continuous process for producing aluminum grain material having a pair of largely flat and parallel opposite faces and jagged edges, and which contains less than 5% by weight of oversize particles larger than a desired size range, comprising welded multiple particles, and less than 0.5% by weight of undersize fine dust-size particles passing a 65 mesh Tyler sieve, which process comprises comminuting aluminum sheet material by shearing by opposed sharp cutting edges in the presence of stearic acid, and at a cutter chamber temperature of below about 70° C.

2. Process according to claim 1 wherein the amount of stearic acid is from 0.05% to 4.0% by weight based on the weight of aluminum feed.

3. Process according to claim 1 wherein the amount of stearic acid is from 0.05% to 0.5% by weight based on the weight of aluminum feed.

4. Process according to claim 1 wherein the amount of stearic acid is from 0.07% to 0.15% by weight based on the weight of aluminum feed.

5. Process according to claim 1 wherein the cutter chamber temperature is below about 65° C.

6. Process according to claim 1 wherein the cutter chamber temperature is from about 35° C. to 50° C.

7. An aluminum particulate material having a pair of largely flat and parallel opposite faces and jagged edges, in which material: (a) less than 5% by weight is oversize particles larger than a desired size range, comprising welded multiple particles, and (b) less than 0.5% is undersize fine dust-free particles passing a 65 mesh Tyler sieve.

8. Material according to claim 7 wherein the proportion of oversize particles is less than 1%.

9. Material according to claim 7 wherein the proportion is oversize particles is less than 0.5%.

10. Material according to claim 7 wherein the proportion of undersize fine dust-size particles is less than 0.2% by weight.

11. Material according to claim 7 wherein the desired size range is from passing a Tyler 6 mesh sieve to retained by a Tyler 65 mesh sieve.

12. Material according to claim 7 wherein the desired size range is from passing a Tyler 10 mesh sieve to retained by a Tyler 65 mesh sieve.

* * * * *